Figure 1:
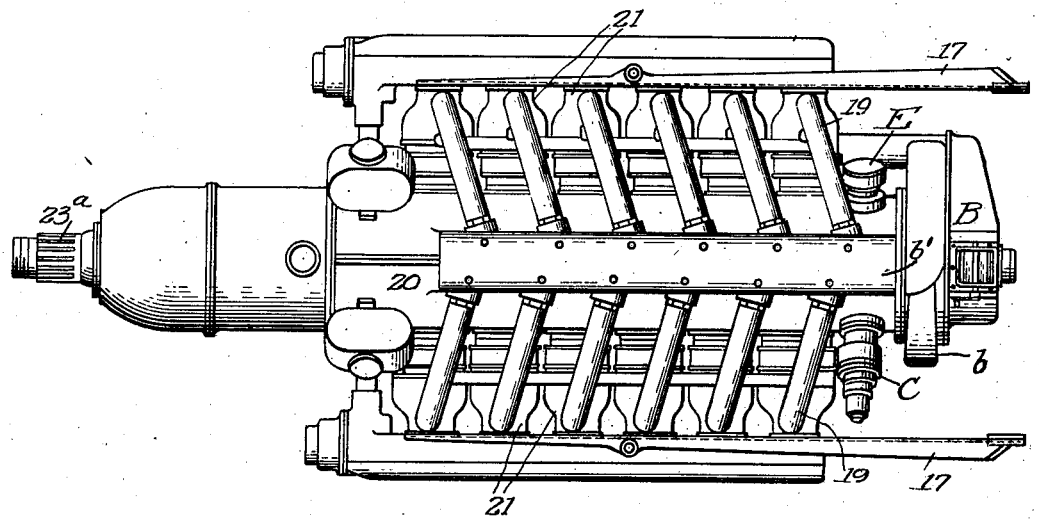

Sept. 5, 1939.   S. K. HOFFMAN ET AL   2,172,100
INTERNAL COMBUSTION ENGINE
Filed Nov. 5, 1934   6 Sheets-Sheet 1

Inventors:
Samuel K. Hoffman
Clarence H. Wiegman
By Fred Gerlach
his Atty

Sept. 5, 1939.  S. K. HOFFMAN ET AL  2,172,100
INTERNAL COMBUSTION ENGINE
Filed Nov. 5, 1934  6 Sheets-Sheet 2

Sept. 5, 1939.  S. K. HOFFMAN ET AL  2,172,100
INTERNAL COMBUSTION ENGINE
Filed Nov. 5, 1934  6 Sheets-Sheet 3

Inventors.
Samuel K. Hoffman &
Clarence H. Wiegman
By Fred Gerlach their Atty.

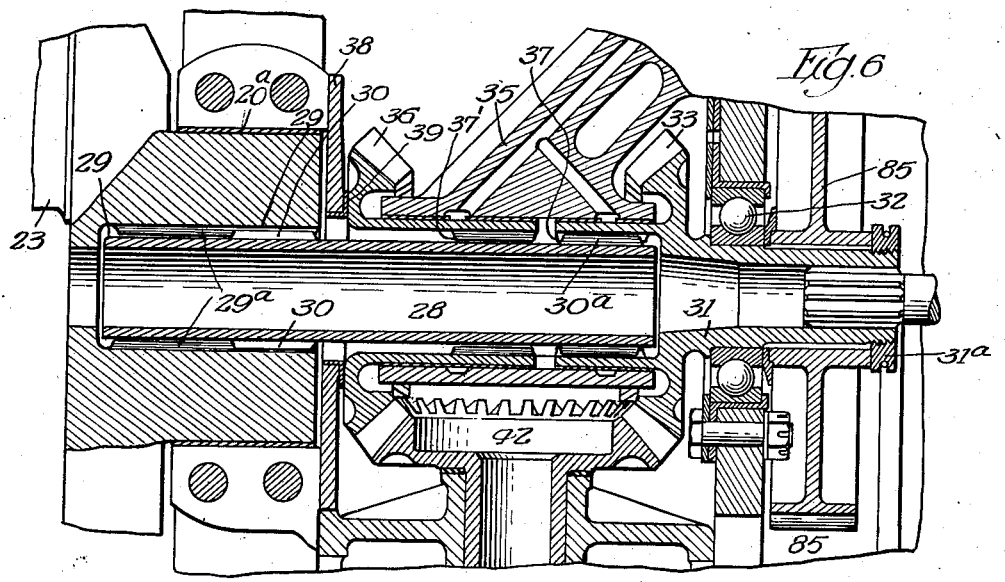
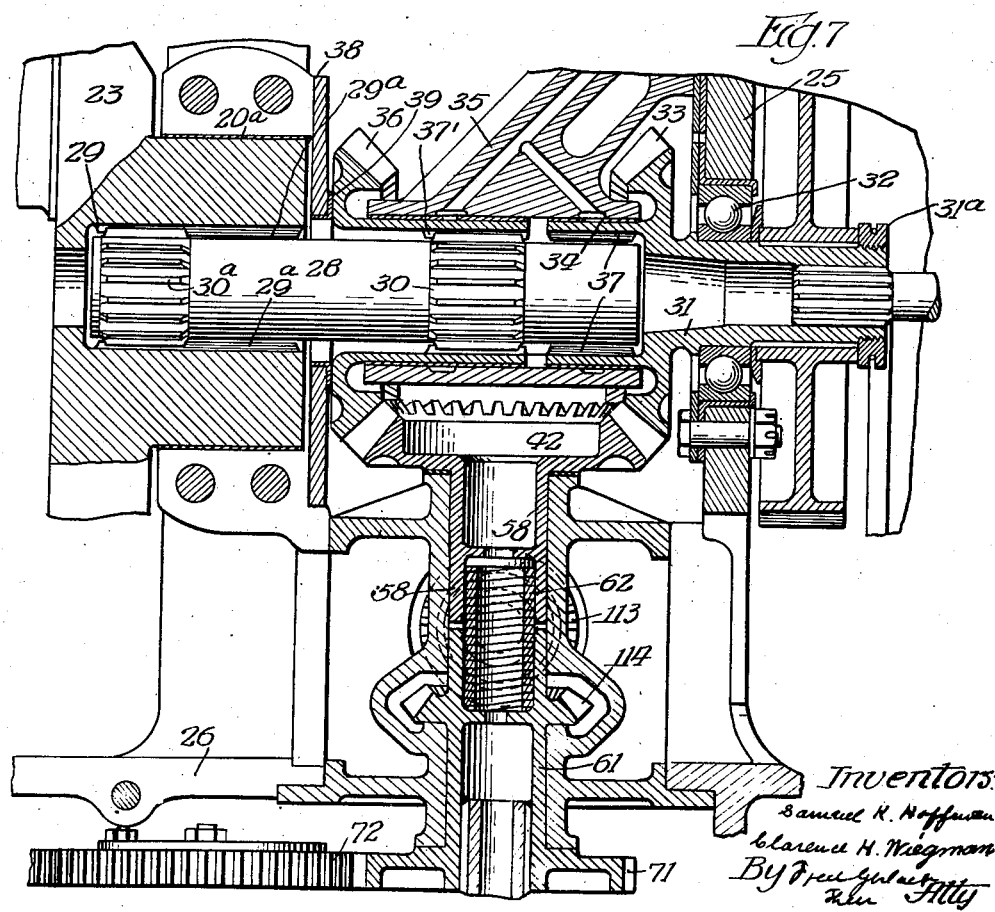

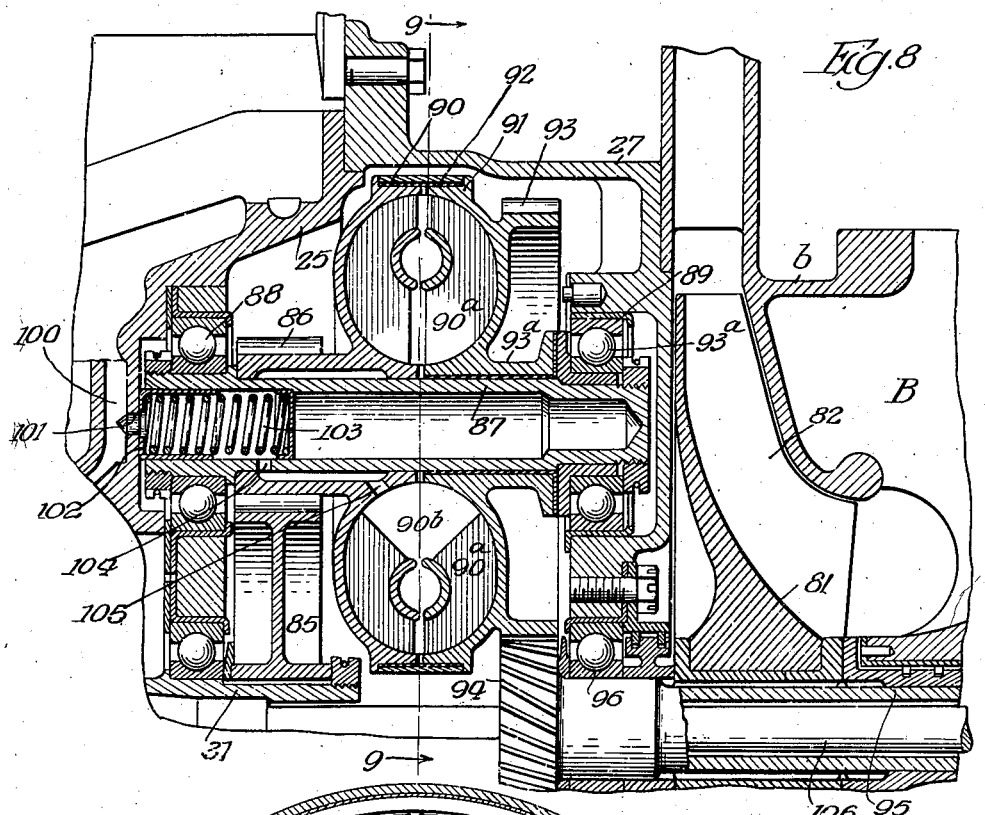
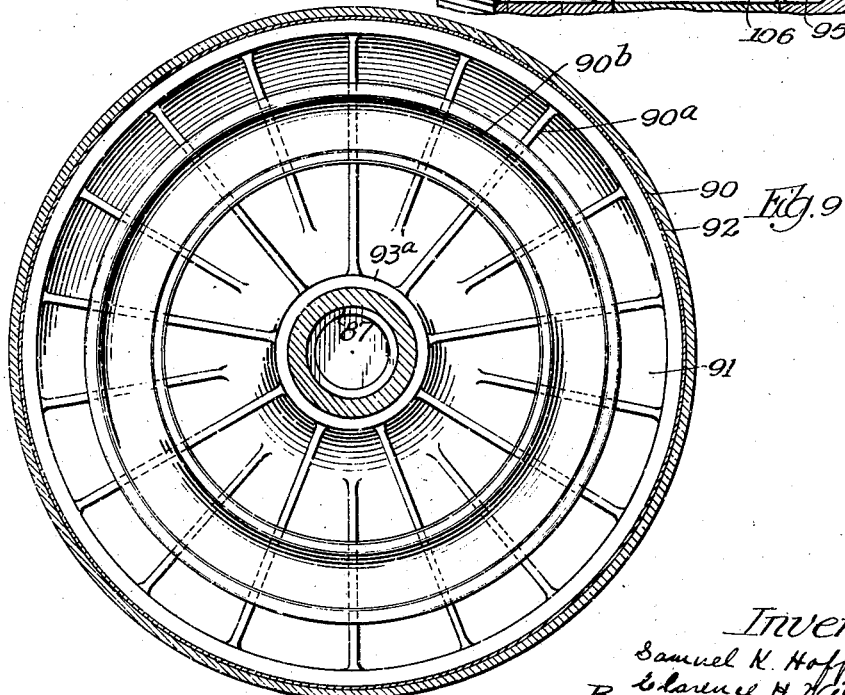

Sept. 5, 1939.  S. K. HOFFMAN ET AL  2,172,100
INTERNAL COMBUSTION ENGINE
Filed Nov. 5, 1934  6 Sheets-Sheet 6

Inventors
Samuel K. Hoffman &
By Clarence H. Wiegman
Fred Gerlach their Atty.

Patented Sept. 5, 1939

2,172,100

UNITED STATES PATENT OFFICE 2,172,100

INTERNAL COMBUSTION ENGINE

Samuel K. Hoffman and Clarence H. Wiegman, Williamsport, Pa., assignors, by mesne assignments, to Aviation Manufacturing Corporation, Chicago, Ill., a corporation of Delaware Application November 5, 1934, Serial No. 751,490

3 Claims. (Cl. 123—195)

The invention relates to internal combustion engines.

In many uses of internal combustion engines a desideratum is to make the direction of rotation of the crank-shaft selective. For axample, in bi-motored aircraft or motorboat power plants it is desired to have the engines driven in opposite directions. In aircraft power plants, particularly in the case of bi-motored airplanes, the torque reaction of the two engines complicates the problem of control design as well as pilotage. The gyroscopic moments which are impressed upon the airplane due to the rotation of elements in the engine when the airplane is flying on a curved path, are factors which render the revolution of the engines in opposite directions, respectively, desirable. When two engines are operated with opposite directions of rotation, the torque reaction and the gyroscopic moments are cancelled out and thus simplify the design and construction of the plane, as well as its pilotage. These conditions make it desirable to use engines driven in opposite directions or to make the direction of rotation of the engine selective or reversible with the minimum amount of labor and exchange of parts. In some engines, such as those using two banks of cylinders and cam shafts for the intake and exhaust valves for each bank, respectively, the direction of rotation can be reversed by a simple interchange of cam shafts and, perhaps, some other minor changes, such as those necessary in the electric wiring for ignition timing. In consequence, the direction of rotation of the engine itself may be selective for this purpose.

Rotary auxiliary equipment or accessories for internal combustion engines, for example, the supercharger, fuel charger, starter, impeller for cooling fluid and lubricant circulating or forcing means are unidirectional for operation with an engine in a single direction and, in consequence, are not usually adapted for operation in opposite or both directions.

In aircraft operations, it is necessary to maintain spare parts and auxiliary equipment for reserve and in the process of overhaul. To meet these requirements, it is necessary, when uni-directional auxiliary equipment is used, to maintain a supply of spare equipment for engines driven in right or left directions, in order to have available spare auxiliary equipment for either type of engine. This involves doubling the number of spare auxiliary equipment, which is normally kept in reserve, to meet the requirements for both right and left engines, and halves the production of each design of the auxiliary equipment, on account of the necessity of producing it for operation in both directions, and doubles the investment in spare parts.

The present invention contemplates the use with engines operated in either direction or in which the direction of rotation is selective, of uni-directional rotary auxiliary equipment, which is operable with an engine operating in either direction, so that it may be operatively associated without structural changes with the same engine when its direction of rotation is reversed, or with any engine, regardless of its direction of rotation.

The primary object of the invention is to provide a power plant which includes an internal combustion engine and uni-directional rotary auxiliary equipment or accessories, such as a super-charger, fuel charger, starter, impeller for cooling fluid and lubricant circulating or forcing means of the rotary type, which are operable with an engine operating in either right or left directions. By providing driving mechanism for the auxiliary equipment which can be selectively changed to operate it in the single direction for which it is designed, from an engine designed to operate in either direction, it becomes unnecessary to provide two types of spare equipment designed for operation with both right and left engines, respectively.

Another object of the invention is to provide means for operating uni-directional rotary auxiliary equipment which can, with minimum labor, be operatively connected to either a right or left engine, to drive the equipment in the single direction for which it is designed.

Another object of the invention is to provide a simple and efficient driving mechanism for the auxiliaries of an internal combustion engine which is readily and easily selectively reversible.

Another object of the invention is to provide simple and efficient means for driving the auxiliaries from the crank-shaft of an internal combustion engine.

Another object of the invention is to provide improved mechanism for driving an impeller from the engine.

Other objects of the invention will appear from the detailed description.

The invention consists in the several novel features hereinafter set forth and more particularly defined by claims at the conclusion hereof.

Figure 2:
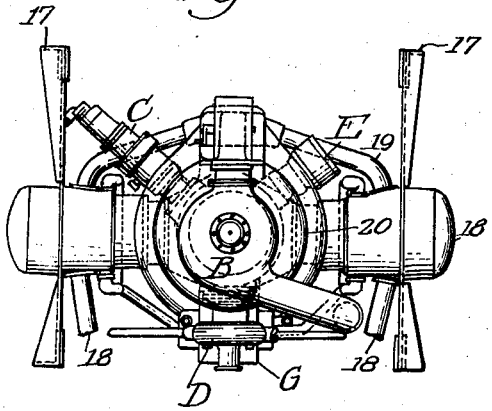
Figure 3:
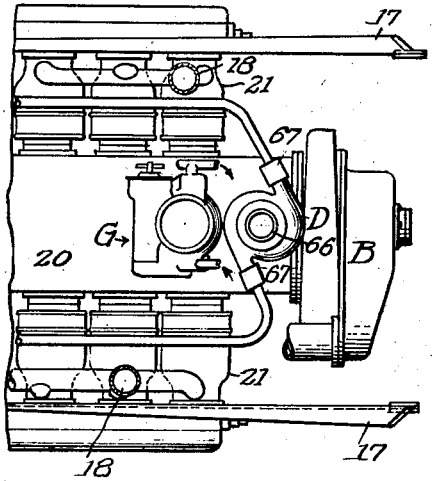
Figure 4:
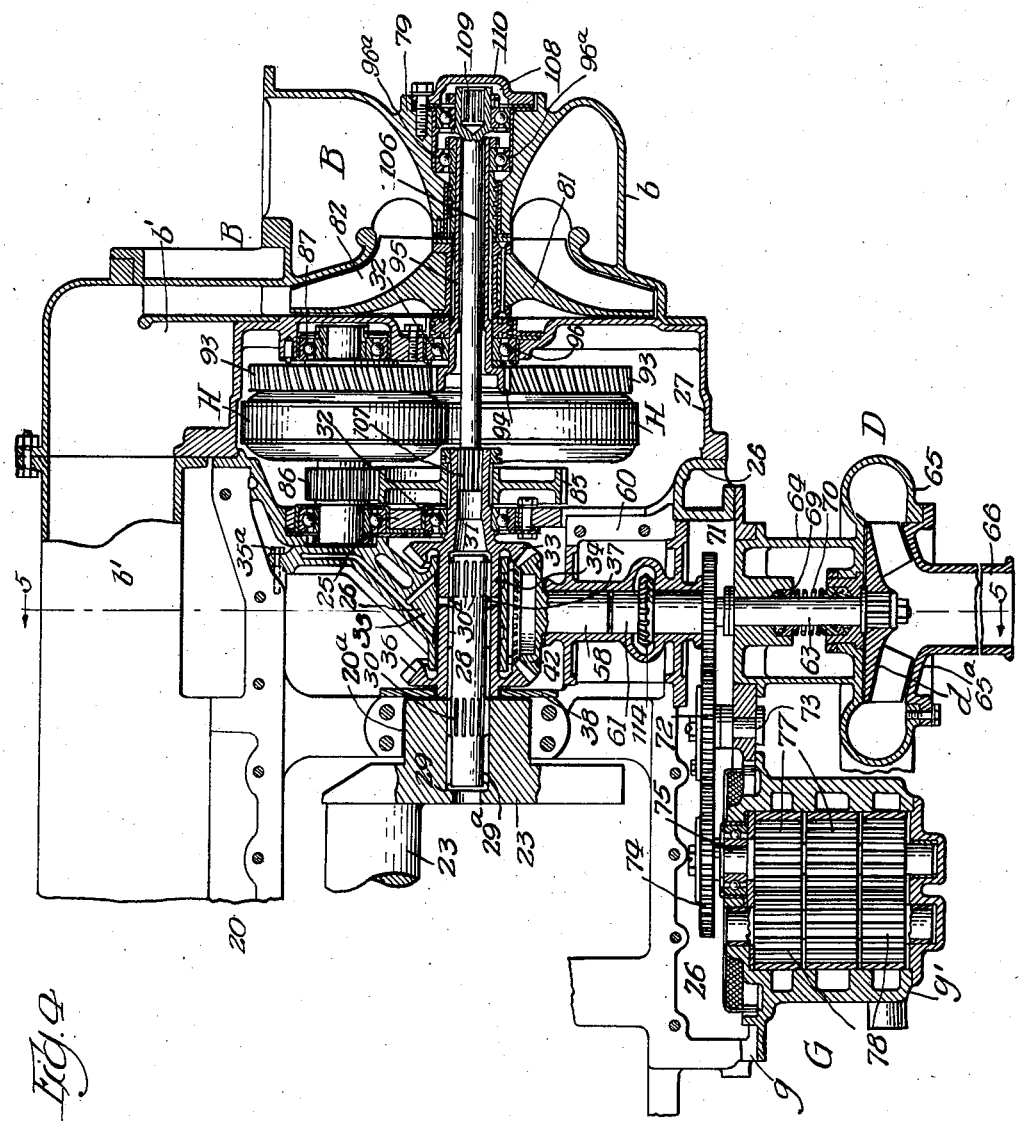
Figure 5:
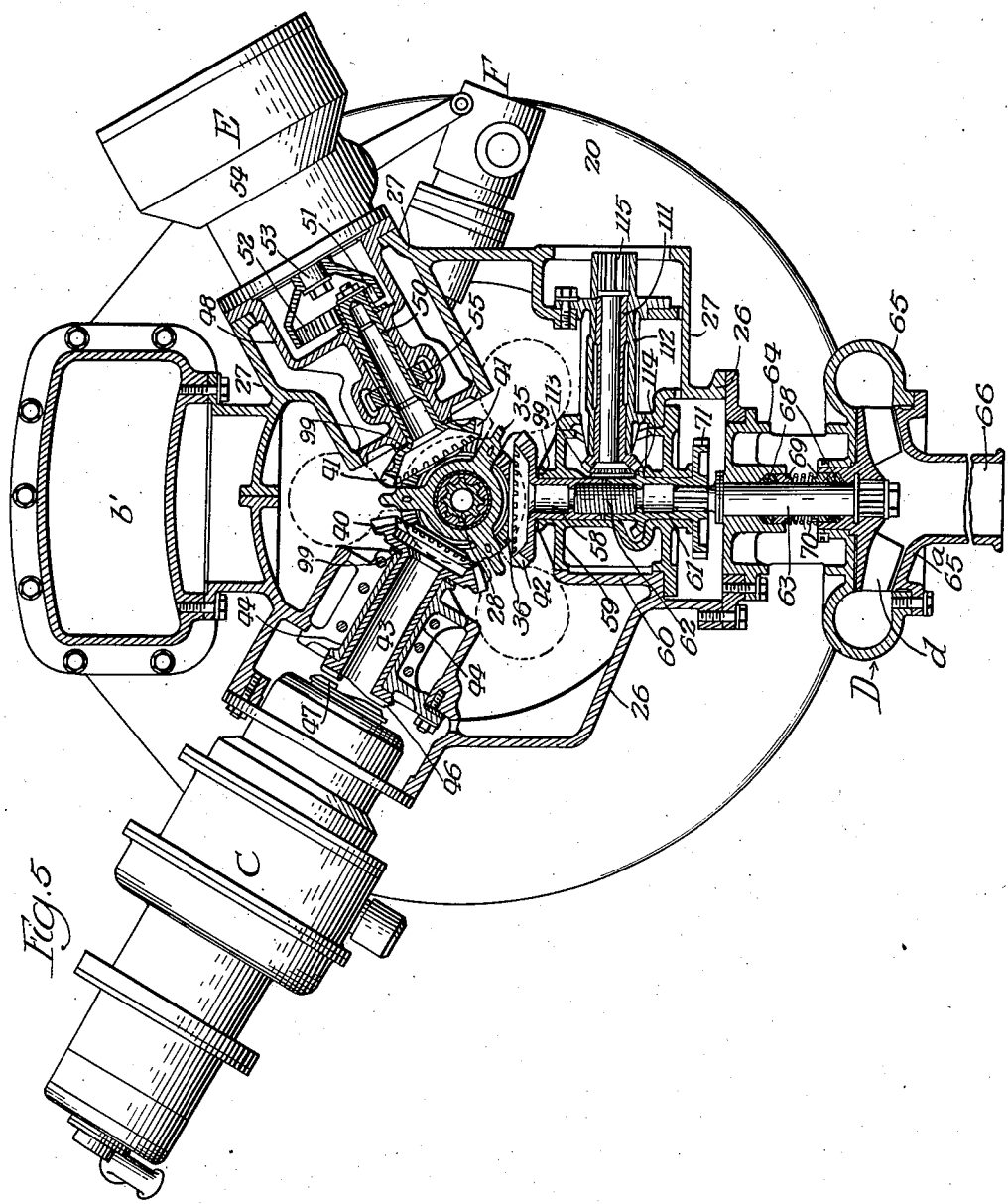
Figure 10:
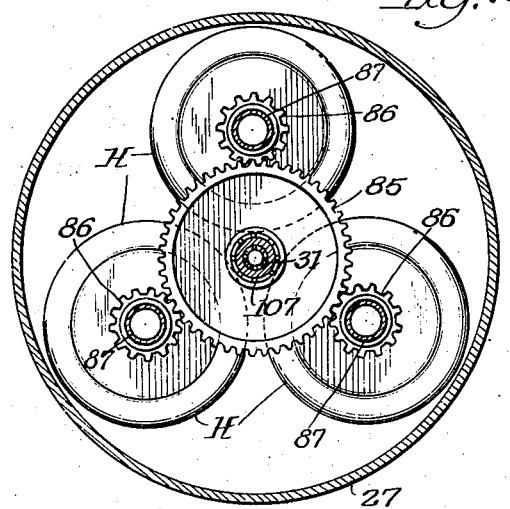
Figure 11:
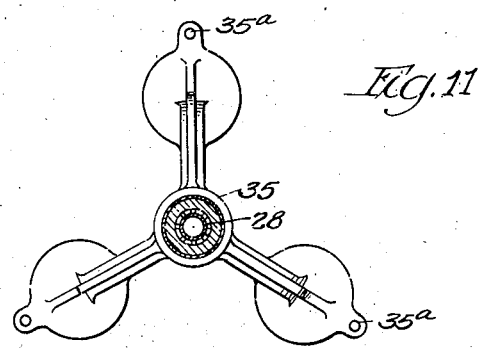

In the drawings:

Fig. 1 is a plan of an engine embodying the invention. Fig. 2 is a rear view of the engine. Fig. 3 is an inverted plan of a portion of the engine. Fig. 4 is a vertical longitudinal section through the rear end of the engine and the driving mechanism for the auxiliary equipment. Fig. 5 is a transverse section on line 5—5 of Fig. 4. Fig. 6 is a longitudinal section illustrating the reversible shaft set for operating the auxiliary equipment when the engine is rotatable in one direction. Fig. 7 is a similar view illustrating the reversible shaft in its alternate position to drive the auxiliary equipment in the same direction from a reversely operating engine. Fig. 8 is a vertical section through the hydraulic driving mechanism for the compressor of the equipment. Fig. 9 is a section on line 9—9 of Fig. 8. Fig. 10 is a transverse section illustrating the gearing and hydraulic drives for one of the impellers. Fig. 11 is a detail of the spider for supporting the drive gears co-axial with the crank-shaft.

The invention is exemplified in an internal combustion engine used for driving an aircraft or other propeller. The engine comprises a casing or crank-case 20, opposed banks of power cylinders 21, containing pistons, respectively, connected to the cranks of a power-shaft 23 which is journaled in the crank-case and extended at its front end 23ª to drive a propeller, intake manifolds 19, exhaust manifolds 18, supporting frames 17, and other usual elements of an internal combustion engine, such as valves, injectors or carbureters and ignition devices, all of which may be of any suitable construction, as well known in the art.

The auxiliary equipment of the engine comprises a compressor B for supercharging the engine, an electric starter C, connectable to initially drive the crank-shaft, a rotary pump D for forcing cooling fluid to the cooling means for the engine, a fuel-charging pump E, a fuel-circulating pump F, and a pump G for circulating lubricant through the lubricating system of the engine, all of which are of the uni-directional rotary type or connected to the engine so that each will function by rotation in a single direction.

The rear end of the crank-shaft 23 is journaled in a bearing 24 in the crank-case which is formed of sections divided vertically. The auxiliary equipment is driven from the rear end of said shaft 23. The driving mechanism for the auxiliary equipment is carried in a rearward extension 26 of the crank-case 20 and a sectional casing or housing, which is carried by the engine case and comprises a head 25 and a member 27, both of which are removably secured to the rear end of the extension 26.

The mechanism for driving the auxiliary equipment comprises a hollow shaft 28, the front end of which extends into an axial socket 29 in the rear end of the crank-shaft 23, which is provided with internal splines 29ª to receive splines on said shaft 28; a shaft 31, coaxial with the shaft 28 and journaled in a bearing 32, carried by the head 25; a beveled gear 33, integral with shaft 31 provided with a forwardly extending hub 34 which is provided with internal splines 37 for engagement with splines on the shaft 28 and which is journaled in the hub of a bearing spider 35, secured at 35ª in the case-extension 26; a mating beveled gear 36 coaxial with gear 33 and provided with a hub extending into and journaled in the hub of spider 35; and a set of beveled intermediate gears 40, 41, 42, which mesh with both of the gears 33, 36. Gears 40, 41 and 42 transmit power between gears 33, 36 and are adapted to drive either of said latter gears from the other and, together with gear 33, are adapted to drive the uni-directional auxiliary equipment, as hereinafter set forth.

Shaft 28 is reversible from end to end in the socket 29 and is provided with splines 30 and 30ª. As shown in Fig. 6, splines 30 on shaft 28 interfit with the splines 29ª in the socket 29 of the crank-shaft and splines 30ª will interfit with the splines 37 on gear 33 to drive said gear in one direction. When gear 33 is driven in the direction of the rotation of the engine, said gear 33 and the gears 40, 41 and 42, through which power is transmitted to all of the auxiliary equipment, will be driven in the proper direction for which the auxiliary equipment is designed, and gear 36 will idle in a direction reverse to that of gear 33. When the shaft 28 is reversed end to end, as shown in Fig. 7, the splines 30ª of shaft 28 will interfit with the splines 29ª on the crank-shaft and splines 30 will interfit with the splines 37' on the gear 36, whereupon the gear 36 will be driven in, and gear 33 will be driven oppositely to, the direction of the rotation of the engine. When the auxiliary equipment is operable to be driven in the direction in which it will be driven by gear 33 rotating in the same direction as the crank-shaft, the reversible shaft 28 will be placed in the position shown in Fig. 6. When the direction of the engine is reversed or the auxiliary equipment is applied to an engine operable in the reverse direction, the shaft 28 will be reversed to the position shown in Fig. 7, to drive gear 36 in the same direction as the engine while gear 33 and intermediate gears 40, 41 and 42 which drive the auxiliary equipment, will be driven in the same direction as they are driven when the reversely rotating crank-shaft, through shaft 28 is connected to drive gear 33. By reversing the shaft 28 to drive either of beveled gears 33, 36 according to the direction of rotation of the engine, the auxiliary equipment driven from gears 33, 40, 41 and 42 will be driven in the single direction for which it is designed and connected to the engines so it will function properly with a crank-shaft being driven either to the right or to the left. This feature adapts the auxiliary equipment for selective functioning with either a left or right hand engine.

The gear 42 between beveled gears 33, 36 remains constantly in mesh with gears 33, 36, and by so doing the intermediate beveled gears 40, 41 and 42 are prevented from backing out of engagement with either of the beveled gears 33, 36 so that increase of tooth stresses and wear is prevented. A thrust plate 38, with a bearing 39, contiguous to the outer face of gear 36, is provided to prevent axial movement of gear 36. The axes of the three beveled intermediate gears 40, 41 and 42 are radial from the axis of the gears 33, 36 to provide compact mechanism for driving the auxiliary equipment.

Beveled intermediate gear 40 is provided with an integral shaft 43 which is mounted in a sectional head 44 which is removably secured in the extension 26 of the crank-case 20 and is adapted to be driven by an electric starter C which may be of any suitable construction. A ratchet clutch 46 is provided on the outer end of shaft 43 and is adapted to be driven by a coaxial clutch wheel 47 on the starter. Clutch wheel 47 is adapted to be automatically coupled with clutch wheel 46 when the starter is operated to start the motor, as well understood in the art. Since gear 40 meshes constantly with gears 33, 36, the direction in which the crank-shaft 23 will be driven by the starter through gears 40, 33, 36 will depend upon the setting of the reversible shaft 28.

When reversible shaft 28 is connected to drive gear 33, the starter, through gear 40, will drive the crank-shaft in one direction, and when shaft 28 is coupled to gear 36, the direction of rotation of the crank-shaft by gear 40 will be in the opposite direction. As a result, the starter mechanism is adapted to drive the crank-shaft to start the engine according to the selected direction of rotation of the engine and by the reversal of shaft 28. This exemplifies means operated by a uni-directionally operated starter, by which the crank-shaft may be driven in opposite directions to correspond with the selected direction of rotation of the starter.

Beveled intermediate gear 41, which meshes with beveled gears 33, 36, is mounted in a sectional head 48 which is removably secured in housing-member 27 and is provided with an integral shaft 50. A pinion 51 is splined to the outer end of shaft 50 and meshes with an internal gear 52 on the shaft 53 of the fuel-charging pump E which is removably secured against the outer end of the head 48 and with said head to housing-member 27. The fuel-charging pump 54 is of the rotary type and may be of any suitable construction, as well understood in the art. Since beveled gear 41 meshes constantly with oppositely rotatable gears 33, 36, the pump 54 will be driven, either by the gear 33 or the gear 36, in the same direction while the crank-shaft 23 is operated in either direction through the properly selected position of shaft 28 so it will operate either one or the other of said oppositely rotating gears. This exemplifies driving mechanism for a rotary fuel-charging pump which is operable in the same direction from a motor rotating in either direction.

A gear 55 is fixed to the shaft 50 of beveled gear 41, is enclosed in the head 48, and is adapted to drive the fuel-circulating pump F through suitable gearing from gear 55. Since shaft 50, to which gear 55 is fixed, is driven in the same direction, from the engine operating in either direction upon the proper setting of the reversible shaft 28, the circulating pump 56 will be driven in the same direction at all times to function with either a right or left-hand engine.

Beveled gear 42, which also meshes with oppositely rotating beveled gears 33, 36, has an integral shaft 58, which is journaled in a sectional head 59, which is mounted in the cylindrical member 60 of the casing extension 26. Shaft 58 is connected to drive a co-axial shaft 61 also mounted in head 59 through an over-running or one-way spring clutch 62 mounted in the cylindrical recesses in the contiguous ends of said shafts, so as to permit shaft 61 to be driven in one direction independently of the shaft 58, intermediate gears 40, 41, 42 and the gears 33, 36.

A shaft 63 for operating the coolant pump d and coaxial with shafts 61 and 58, is journaled in a head 64 which is removably secured to a member of the case-extension 26, and has its upper end splined to shaft 61. The pump D comprises a casing 65 consisting of a member integrally formed with the head 64, a cover 65ᵃ, and a rotor or impeller d for circulating fluid through the cooling means of the engine fixed to the lower end of shaft 63, which extends into casing 65. The casing has a depending inlet duct 66 and outlet ducts 67 for delivering cooling fluid to the engine, wherever desired. Since gear 42, which drives the impeller for the cooling fluid, is alternately driven by gears 33, 36, when the engine is rotating in opposite directions, the impeller will always be driven in the same direction and function to deliver the cooling fluid to the engine. Shaft 63 is sealed by packings 68, glands 69, and a spring 70 interposed between the glands.

A gear 71 is formed on the hollow shaft 61 which is driven by the over-running or one-way clutch 62 and serves to drive the lubricant pump G. Gear 71 meshes with an idler gear 72 which is mounted on a stud 73 which is carried by a head g which is removably secured to the bottom of the casing-extension 26, which contains an oil sump from which lubricant can flow to pump G. Idler gear 72 meshes with a gear 74 which is fixed to the drive-shaft 75 of the pump C which is illustrated as the three-stage type, each stage comprising a pair of intermeshing gears 77, 78. Two of the stages may be connected to scavenge the lubricating oil from the crank-case and one may be used to supply lubricating oil under pressure to the lubricating system of the engine. The case g' of pump G is removably mounted on the head g which is secured to the casing-extension 26. Since the lubricating pump G is driven from beveled gear 42 through shafts 58, 61, gears 71, 72, 74, and gear 42 is driven in the same direction while the engine is driven in either direction, through the selective adjustment of shaft 28, the gear pump G will be driven in the same direction at all times, to function with the engine while it is driven in either direction or with engines rotating in opposite directions.

The compressor B for forcing air to super-charge the motor comprises a casing b which is secured to the back of a housing-member 27 which is fixed to the rear end of the crank-case extension 26, and an impeller or rotor 81 with blades 82 for drawing air from a valve-controlled intake 83, and propelling it from the casing b into the manifold b' which delivers the air to the intakes of the engine cylinders, as well understood in the art. Impeller 81 is driven from beveled gear 33 so that it will always be driven in the same direction while the crank-shaft of the motor is rotated in either direction.

The driving mechanism for the compressor B comprises a gear 85 which is splined to the hub 31 which is integral with gear 33 and removably secured on said hub by a screw collar 31ᵃ; a set of three pinions 86 which mesh with gear 85; a set of three helical gears 93; a hydraulic drive between each of the pinions 86 and gear 93; a helically toothed pinion 94 which meshes with the gears 93 and is integrally formed with the shaft 95 to which the rotor 81 of the impeller B is splined. Shaft 95 is coaxial with gear 85 and is journaled in a bearing 96 in the housing-member 27 and a bearing 96ᵃ in the impeller housing b.

Each hydraulic drive comprises a pair of annular complementary casing-sections 90, 91, each of which is provided with suitable radial vanes 90ᵃ and a concave circular web 90ᵇ, and an annular band 92 lapping the peripheries of said casing-sections and permitting relative slippage so that the gears 93 will be driven from gear 86 and sections 90 through the hydraulic medium contained in the sections. Each casing-section 90 is integral with one of the pinions 86 and these are splined to rotate with a hollow shaft 87 which is journaled in a bearing 88 in the head 25 and a bearing 89 in housing member 27. Each helical gear 93 is integral with the casing-section 91 and their common hub is journaled to rotate on the hollow shaft 87. A thrust bearing 93ª is provided between said hub and bearing 89. Each band 92 is provided with a lining of suitable material to permit slippage between the casing-sections 90, 91 to resiliently drive the impeller B.

Pinion 94 and gears 93 are provided with helical teeth so proportioned that the tangential tooth load will develop an axial component which will approximately balance the axial thrust produced by the impeller 81. This thrust is due to the reduction in static pressure developed by the increase in velocity through the impeller. The reduction in pressure over the area of the operative face of the impeller creates a force acting to move shaft 95 in the direction of bearing 96. The opposed axial component of the helical teeth on gears 94 is designed to neutralize or reduce this force and thereby minimize the axial loads on bearings 96, 96ª, thus reducing their friction. Helical pinion 93, which meshes with helical gears 94 transfers the axial thrust of the impeller to the gears on the hydraulic drive. This is the economical place to absorb the trust because it is divided through the gears associated with the hydraulic drive which run at a much slower speed than the impeller itself.

Since the super-charge absorbs a substantial percentage of the engine power when not more directly driven with shaft 28 and gear shaft 31, it is advantageous to drive it through three beveled gears 40, 41 and 42, which are equidistantly spaced around the axis of the crank-shaft and shaft 28, thereby minimizing the tooth stresses and the radial loads and the friction on the bearing surfaces. To assist in equalizing the tooth loads, any backlash of the gears 40, 41 and 42 is taken up by shims 99.

Engine lubricating oil under pressure is delivered to duct 100 in head 25 from the lubricant circulating pump, and from said duct lubricant is supplied to the bearings for gears 33, 36 in spider 35.

Each hydraulic drive is supplied with engine lubricating oil, under pressure, through a port 101 in the head 25. A plunger 102 loaded by a spring 103 prevents excessive leakage and loss of pressure at the point where the oil is introduced into the shaft 87. From port 101 the oil passes through button 102 into shaft 87 and through port 104 in said shaft and duct 105 to the hydraulic drive casing. The hydraulic drives are normally subjected to oil pressure to compensate for the leakage past the band 92.

The hydraulic drives for driving the impeller for supercharging the engine which is driven at high speed, protects the gears 93, 94 from angular acceleration arising from torsional vibration in the crank-shaft and abrupt variation in engine speed. It also reduces the gear tooth stresses and permits the use of lighter and more compact gears.

Since the compressor B is driven from beveled gear 33 through the gearing last described, it will always be driven in the same direction while the engine is rotated in opposite direction.

A shaft 106, coaxial with the crank-shaft and shaft 28, is splined at 107 to the shaft 31 of gear 33. This shaft extends outwardly through the hollow shaft 95 which carries and drives the impeller 81 and has its outer end journaled in a bearing 108 carried by the casing 79 of the supercharger. The outer end of this shaft has a splined socket 109 which is adapted to receive a shaft for any additional auxiliary mechanism desired. A cap 110 is secured to enclose the end of shaft 109 when it is not in use.

A hollow shaft 111 is journaled in a head 112 which is removably secured in the housing-member 27 and carries at its inner end an integral beveled gear 113 which meshes with a beveled gear 114 integral with the shaft 61 which is driven through the over-running spring clutch 62. The outer end of shaft 111 is provided with a splined socket 115 to adapt it to receive the shaft of a small electric motor. The purpose of the over-running clutch 62 and this shaft 111 is to permit the impeller for the cooling fluid and the lubricant pumps which are also driven by shaft 61, to be operated independently of the engine and the other auxiliary equipment.

Starting the engine in cold weather is sometimes difficult and, by connecting a supply of hot liquid to the inlet of the impeller 65 normally used for the coolant, the liquid delivered to the cooling surfaces of the engine can be preheated for starting. It is also possible to preheat the lubricating oil by an electric heater and operate the pump G to circulate warm oil through the engine. When it is necessary in starting the engine, the liquid entering the impeller 65 is heated and the lubricating oil is heated and the shaft 111 is operated by an electric motor or other suitable means which will cause said impeller and the lubricant pump to supply heated liquid and warm oil to the engine preparatory to starting it. During this operation the impeller D and pump G will be operated independently of the engine and the other auxiliary equipment, because the over-running clutch 62 will permit shaft 61 to rotate independently of shaft 58. This exemplifies means for driving the impeller for the coolant, and the lubricant pump, independently of the engine for starting purposes and which will be continuously operated by the engine when it is run.

In operation, the engine drives the entire auxiliary equipment through shaft 28. If the engine is set to operate, or is operative in one direction, the shaft 28 will be placed in the position shown in Figs. 4 and 6, to drive the gear 33 by means of spline 37. The entire auxiliary equipment will then be driven in the proper direction for which it is designed. When the engine is set so as to be, or is operated in the reverse direction, the shaft 28 will be reversed, as shown in Figure 9, so that its spline 30 will drive the gear 36 which, through gears 40, 41, 42 rotates in the opposite direction to gear 33. By connecting the shaft 28 to drive the oppositely rotating gear 36, with the oppositely running crank-shaft, the entire auxiliary equipment will function in its proper direction, notwithstanding the change in direction of rotation of the engine.

If the direction of rotation of the engine should be changed, say, from right to left, or vice versa, it is only necessary to reverse the shaft 28 endwise to drive either of the oppositely rotating gears 33, 36 to drive the elements of the auxiliary equipment in the single direction for which they are designed. To accomplish this, it is only necessary to remove the head 26 and casing 27 and the mechanism carried thereby from the crankcase 20 to provide access to shaft 28 for its reversal. Similarly, by reversing the shaft 28, the rotary uni-directional auxiliary equipment may be driven in the correct direction to function when applied to either a right or left-hand engine. Therefore, the entire auxiliary equipment is usable with an engine either a right or left-hand type.

The invention exemplifies auxiliary equipment for the engine which is adapted to function in a single direction with an engine rotating in either direction and which, without change in structure, and by simple reversal of the shaft 28, is adapted to function with engines rotatable in opposite directions, or with an engine in which the direction of rotation is selective.

The invention also exemplifies driving mechanism for the auxiliary equipment, which is adapted to be connected to a motor operating in either direction with a minimum of labor. In aircraft operation, the same auxiliary equipment thus becomes adapted for either right or left engines, without change in structure, and by selective position of the shaft 28 between the drive mechanism for the equipment and the engine. In aircraft operation, this is an important advantage because it dispenses with the necessity of different auxiliary equipment for engines rotating in opposite directions.

The invention also exemplifies improved driving mechanism for the auxiliary equipment which is readily applicable to engines rotating either in right or left-hand direction.

The invention also exemplifies improved mechanism for driving the auxiliary equipment which is efficient in operation. Also improved mechanism for driving the impeller of the supercharger through hydraulic drives and in which the thrust stresses developed by the rotor of the impeller are economically applied.

The invention is not to be understood as restricted to the details set forth since these may be modified within the scope of the appended claims without departing from the spirit and scope of the invention.

Having thus described the invention, what we claim as new and desire to secure by Letters Patent is:

1. In an accessory unit for internal combustion engines, the combination of a housing adapted for attachment to one end of the engine casing, accessory driving gearing comprising a pair of gears, an intermediate gear meshing with the pair of gears for opposite rotation, and an endwise reversible shaft adapted to connect an engine-driven shaft with either of the pair of gears to drive the gearing in the same direction from either a right or left-hand engine.

2. In an accessory unit for internal combustion engines, the combination of a housing adapted for attachment to one end of the engine casing, accessory driving gearing comprising a pair of bevel gears, an intermediate bevel gear connecting the gears for opposite rotation, and an endwise reversible shaft adapted to connect an engine-driven shaft with either of the pair of gears to drive the gearing in the same direction from either a right or left-hand engine.

3. In an accessory unit for internal combustion engines, the combination of a housing adapted for attachment to one end of the engine casing, accessory driving gearing comprising a pair of coaxial bevel gears, an intermediate bevel gear connecting the pair of gears for opposite rotation, a series of radial shafts, a bevel gear on each radial shaft meshing with each of the coaxial gears, and a shaft coaxial with the coaxial gears, and accessories driven by said shafts respectively and an endwise reversible shaft adapted to connect an engine-driven shaft with either of the pair of coaxial gears to drive the gearing in the same direction from either a right or left-hand engine.

SAMUEL K. HOFFMAN.
CLARENCE H. WIEGMAN.